(12) United States Patent
Shimbori et al.

(10) Patent No.: US 6,525,290 B2
(45) Date of Patent: Feb. 25, 2003

(54) ACCUMULATOR AND MANUFACTURING PROCESS THEREOF

(75) Inventors: Takeyoshi Shimbori, Yokohama (JP); Chiharu Umetsu, Yokohama (JP); Kouji Nakamura, Yokohama (JP); Hiroshi Mizukami, Yokohama (JP); Naoki Ueno, Yokohama (JP)

(73) Assignee: NHK Spring Co., Ltd., Tokyo (JP)

( * ) Notice: Subject to any disclaimer, the term of this patent is extended or adjusted under 35 U.S.C. 154(b) by 20 days.

(21) Appl. No.: 09/902,565

(22) Filed: Jul. 12, 2001

(65) Prior Publication Data
US 2001/0037834 A1 Nov. 8, 2001

Related U.S. Application Data

(62) Division of application No. 09/569,299, filed on May 11, 2000.

(30) Foreign Application Priority Data

May 12, 1999 (JP) ............................. 11-131438
Oct. 15, 1999 (JP) ............................. 11-293792
Nov. 24, 1999 (JP) ............................. 11-332756

(51) Int. Cl.[7] .................................. B23K 11/10
(52) U.S. Cl. .................. 219/91.23; 219/93; 219/91.2
(58) Field of Search ...................... 219/91.23, 93, 219/86.1, 91.2, 117.1; 138/155, 157

(56) References Cited

U.S. PATENT DOCUMENTS 2,365,994 A    12/1944  Ashton
3,610,870 A *  10/1971  Sakamoto ................. 219/56.21
3,714,964 A     2/1973  Livingston
4,408,900 A *  10/1983  Takasugi et al. ............ 219/85.1
4,427,869 A *   1/1984  Kimura et al. .............. 219/86.9
4,495,397 A *   1/1985  Opprecht et al. ........... 219/86.1
4,691,739 A     9/1987  Gooden
4,997,009 A     3/1991  Niikura et al.

FOREIGN PATENT DOCUMENTS

EP   0 391320 A1   10/1990
GB     603363      6/1948
WO   0 011350      3/2000

OTHER PUBLICATIONS

Partial European Search Report dated May 2, 2001.

\* cited by examiner

Primary Examiner—Tom Dunn
Assistant Examiner—Colleen P. Cooke
(74) Attorney, Agent, or Firm—Arent Fox Kintner Plotkin & Kahn, PLLC

(57) ABSTRACT

Disclosed is an accumulator comprising: a pressure vessel; an elastic bellows in which a compressed gas is sealed, an end of the bellows being fixed to an interior of the pressure vessel; a flow path having an opening communicating with the interior and an exterior of the pressure vessel; a valve connected to a movable end of the bellows to operatively close the opening according to elastic motion of the bellows; and a hydraulic chamber partitioned from a gas chamber formed in an interior of the bellows containing the compressed gas. The valve comprises an upper surface which can cover the opening, and plural circular protrusions which surround the entire circumference of the opening and can closely contact the circumference of the opening.

4 Claims, 12 Drawing Sheets

ACCUMULATOR AND MANUFACTURING PROCESS THEREOF

This is a Division of application Ser. No. 09/569,299 filed May 11, 2000. The disclosure of the prior application is hereby incorporated by reference herein in its entirety.

BACKGROUND OF THE INVENTION

1. Field of the Invention

The present invention relates to an accumulator having a bellows, which is used for pressure accumulation or pulsation absorbing in hydraulic devices in automobile brake systems and various industrial hydraulic systems. The present invention further relates to a manufacturing process for accumulators such as the above, and more specifically relates to a joining method for shells which form a vessel for enclosing oil and gas therein.

2. Background Art

FIG. 5 shows an accumulator used for hydraulic devices in automobile brake systems and various industrial hydraulic systems. The inside of a housing 31 acts as a pressure vessel and is partitioned into a gas chamber 33 in which a compressed gas is sealed therein and a hydraulic chamber 34 by a metallic bellows assembly 32. The metallic bellows assembly 32 comprises an elastic metallic bellows 35, of which one end is fixed to the housing 31 and the free end thereof is equipped with a valve 37. The hydraulic chamber 34 defined in the interior of the housing 31 and exterior of the metallic bellows 35 is communicated with an external system through an opening 38a provided in the housing 31 and a flow path 38.

In such accumulator, when the hydraulic pressure transmitted from the flow path 38 is lower than the gas pressure sealed in the gas chamber 33 and the pressure in the hydraulic chamber 34 coincides with the low pressure, a differential pressure occurs between the gas chamber 33 and the hydraulic chamber 34. As a result, the metallic bellows 35 is extended and the valve 37 is thrust and closely contacted to the circumference of the opening 38a, thereby closing the opening 38a, and the valve 37 therefore self-seals so as to make the pressure of the hydraulic chamber 34 greater that of the gas chamber 33.

The valve 37 may not be able to exhibit sealing properties in closing due to factors such as aging degradation thereof and jamming of foreign matter such as dust. When the pressure transmitted from the flow path 38 is low, the pressure in the hydraulic chamber 34 also becomes low. As a result, stress is generated in the metallic bellows 35 due to the differential pressure between the hydraulic chamber 34 and the gas chamber 33, so that the durability thereof is lowered.

The end plate of the accumulator must be thick since it is slab-shaped, which results in increased weight of the overall accumulator. Therefore, end plates having semicircular or semi-ellipsoid cross section, which can disperse stress, are mainly used.

In accumulators, the stroke of the metallic bellows contained therein is essential for designing the volume of the gas to be sealed therein. The cylindrical portion of the pressure vessel is effective for pressure accumulation. In the end plates having semicircular or semi-ellipsoid cross section, the curved portion is a dead space and is generally employed merely for containing the liquid. Therefore, it has been desired to effectively use this dead space.

The accumulator absorbs pulsation by the elastic motion of the metallic bellows. However, the pressure of the pulsation occurring at a pressure lower than that of the sealed gas is lower than the operating pressure of the accumulator, so that the pulsation cannot be absorbed by the above construction. Heretofore, a special resonance box having a frequency corresponding to the pulsation is provided to absorb the pulsation. This results in large design and increased weight of the accumulator.

The pressure vessel of the accumulator consists of at least two shells for containing the bellows and other necessary parts, and such a manufacturing process is applied so that the bellows and the like are attached to one shell, and another shell is then put over the bellows and the like and is joined to the other shell. In the conventional joining method, the outer surface portion of the joining portion has been welded over the entire circumference by gas welding or tungsten inert gas welding.

However, these welding methods require long operation time, and mass-production efficiency is therefore not good and production cost is relatively high. Therefore, developments in methods for efficiently joining shells have been desired.

SUMMARY OF THE INVENTION

An object of the present invention is to improve reliability of self-sealing properties of accumulators. Another object of the invention is to provide an accumulator which can efficiently use the dead space formed by the end plate having semicircular or semi-ellipsoid cross section in the pressure vessel and can absorb pulsation with optional frequency without large design and being heavy. A further object of the invention is to provide a manufacturing process for accumulator, in which shells are efficiently joined, manufacturing time is shortened, and manufacturing cost is decreased.

The invention provides an accumulator comprising: a pressure vessel; an elastic bellows in which a compressed gas is sealed, an end of the bellows being fixed to an interior of the pressure vessel; a flow path having an opening communicating with the interior and an exterior of the pressure vessel; a valve connected to a movable end of the bellows to operatively close the opening according to elastic motion of the bellows; and a hydraulic chamber partitioned from a gas chamber formed in an interior of the bellows containing the compressed gas; wherein the valve comprises an upper surface which can cover the opening, and plural circular protrusions which surround the entire circumference of the opening and can closely contact the circumference of the opening.

Furthermore, the inventors noted that a hydraulic chamber may function as a resonance box according to the frequency of pulsation, and have made the invention based on this. The invention provides an accumulator comprising: a pressure vessel having an end plate curving convexly outward; an elastic bellows having two ends, one of the ends being connected to the end plate of the pressure vessel via a plug member and the other of the ends being closed so as to partition the interior of the pressure vessel into a hydraulic chamber communicated with an exterior system and a gas chamber sealing a compressed gas; and a resonance box formed at the plug member in a location of the end plate so as to absorb predetermined pulsation; wherein the plug member is replaceable.

The invention further provides a manufacturing process for an accumulator, the process comprising: assembling a buffer member into a cylindrical shell so as to partition a interior of the shell into a gas chamber and a hydraulic chamber; and closing the shell; wherein the shell comprises shell portions divided in the direction of an axis of the shell; a circular circumferential portion projecting outward is formed over the entire circumference of each joining portion of the shell portions; a circular protrusion projecting in a joining direction is formed at the circular circumferential portion of at least one of the shell portions; the circular protrusions are brought into contact with each other, or alternatively the circular protrusion is brought into contact with the circular circumferential portion of another shell portion; the circumferential portions are clamped and pressed by a pair of electrodes; and the electrodes are energized so as to join the joining portions by electric resistance welding.

According to the manufacturing process for an accumulator in the invention, the joining portions of the shell portions are directly pressed and clamped by the electrodes. The circumferential portion projecting outward is formed so that the electrodes come into proximity with each other. When the circular protrusion is formed in each circumferential portion, the circular protrusions are brought into contact with each other. When the circular protrusion is formed in one of the circumferential portions, the circular protrusion is brought into contact with another circumferential portion. The electric resistance welding through bringing protrusions into contact each other is called "projection welding", in which the welding is performed over the entire circumference with instantaneous energization. Therefore, the time required for welding the shell portions can be greatly shortened compared to the conventional welding method. As a result, mass production efficiency is improved and manufacturing cost can be reduced.

BRIEF EXPLANATION OF THE DRAWINGS

FIGS. 9A and 9B are cross sections showing a process in which a bottom seal and a port of a bellows are welded by projection welding, wherein FIG. 9A shows a status before welding and FIG. 9B shows a status after welding.

FIGS. 10A and 10B are cross sections showing a process in which a cap shell and a port are welded by projection welding, wherein FIG. 10A shows a status before welding and FIG. 10B shows a status after welding.

FIGS. 11A and 11B are cross sections showing a process in which a cap shell and a plug retainer are welded by projection welding, wherein FIG. 11A shows a status before welding and FIG. 11B shows a status after welding.

DETAILED EXPLANATION OF THE INVENTION

Preferred embodiments of the invention will be explained in detail hereinafter.

Figure 1:
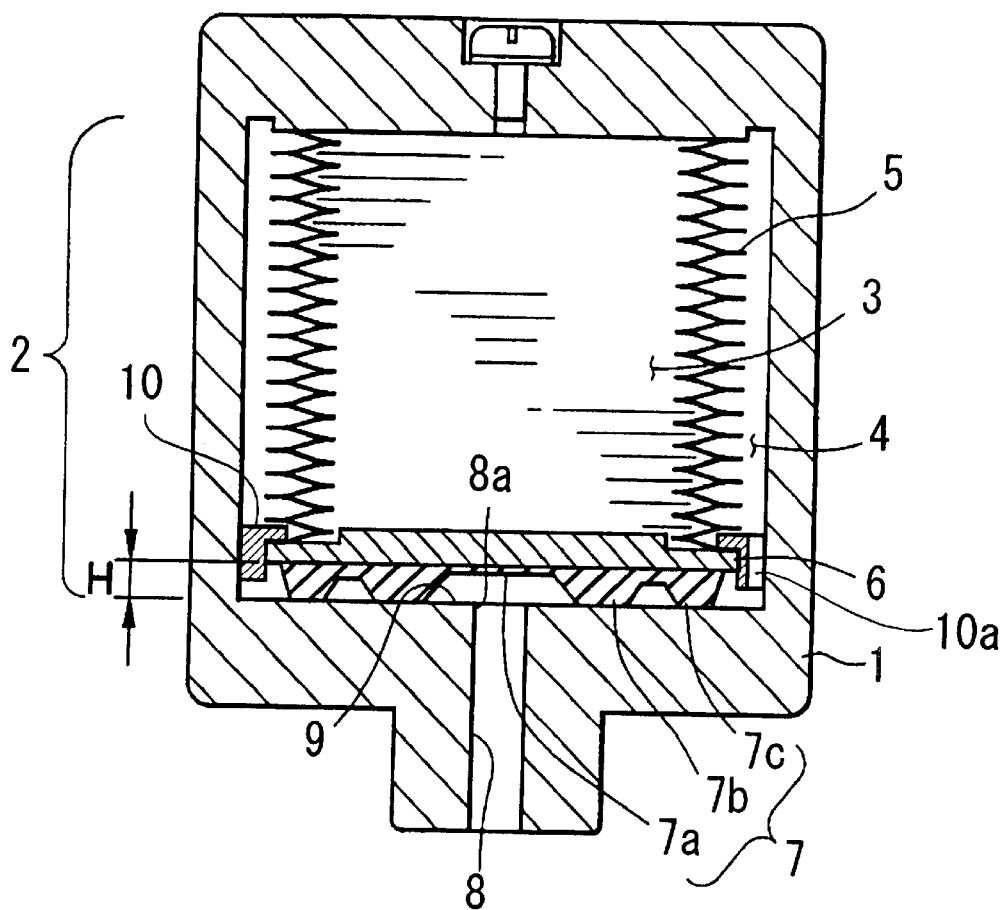
FIG. 1 is a side cross section of an accumulator of the first embodiment according to the invention.

FIG. 1 shows a cross section of an accumulator according to the first embodiment of the invention. Reference numeral 1 is a housing acting as a pressure vessel. The interior of the housing 1 is partitioned by a metallic bellows assembly 2 contained therein into a gas chamber 3 and a hydraulic chamber 4. The metallic bellows assembly 2 comprises a metallic bellows 5 having plural ribs. An end of the metallic bellows 5 is fixed to the housing 1 and the metallic bellows 5 is elastic in the axial direction of the housing 1. The assembly 2 comprises a plate 6 fixed to the free end of the metallic bellows 5 and a valve 7 fixed to the plate 6. The valve 7 is made from elastomeric materials such as rubber. A compressed gas is sealed in the gas chamber 3 in the metallic bellows 5. The hydraulic chamber 4 defined in the housing 1 and in the exterior of the metallic bellows 5 is communicated with an external system through an opening 8a and a flow path 8 formed in the housing 1.

A bellows guide 10 is fixed at the circumference of the plate 6. The bellows guide 10 is ring-shaped and slideably fitted into the inner surface of the housing 1. Plural through holes 10a are formed at the outer circumference of the bellows guide 10 therealong at regular intervals. The bellows guide 10 support the free end of the metallic bellows 5 so that it may not swing in the elastic motion thereof. In the elastic motion of the metallic bellows 5, the hydraulic fluid in the hydraulic chamber 4 passes through the through hole 10a.

According to the accumulator, when the pressure transmitted through the flow path 8 is lower than that of the gas sealed in the gas chamber 3 and the pressure in the hydraulic chamber 4 coincides with the low pressure, a differential pressure occurs between the gas chamber 3 and the hydraulic chamber 4. As a result, the metallic bellows 5 is extended and the valve 7 is thrust and closely contacted with the circumference of the opening 8a, thereby closing the opening 8a, and the valve 7 therefore self-seals so as to make the pressure of the hydraulic chamber 4 greater that of the gas chamber 3.

The valve 7 consists of an upper surface portion 7a which can cover the opening 8a, a first circular protrusion 7b surrounding the entire circumference of the opening 8a and which closely contacts the circumference of the opening 8a, and a second circular protrusion 7c which is formed around the first circular protrusion 7b and which closely contacts the entire circumference of the opening 8a.

Figure 2:
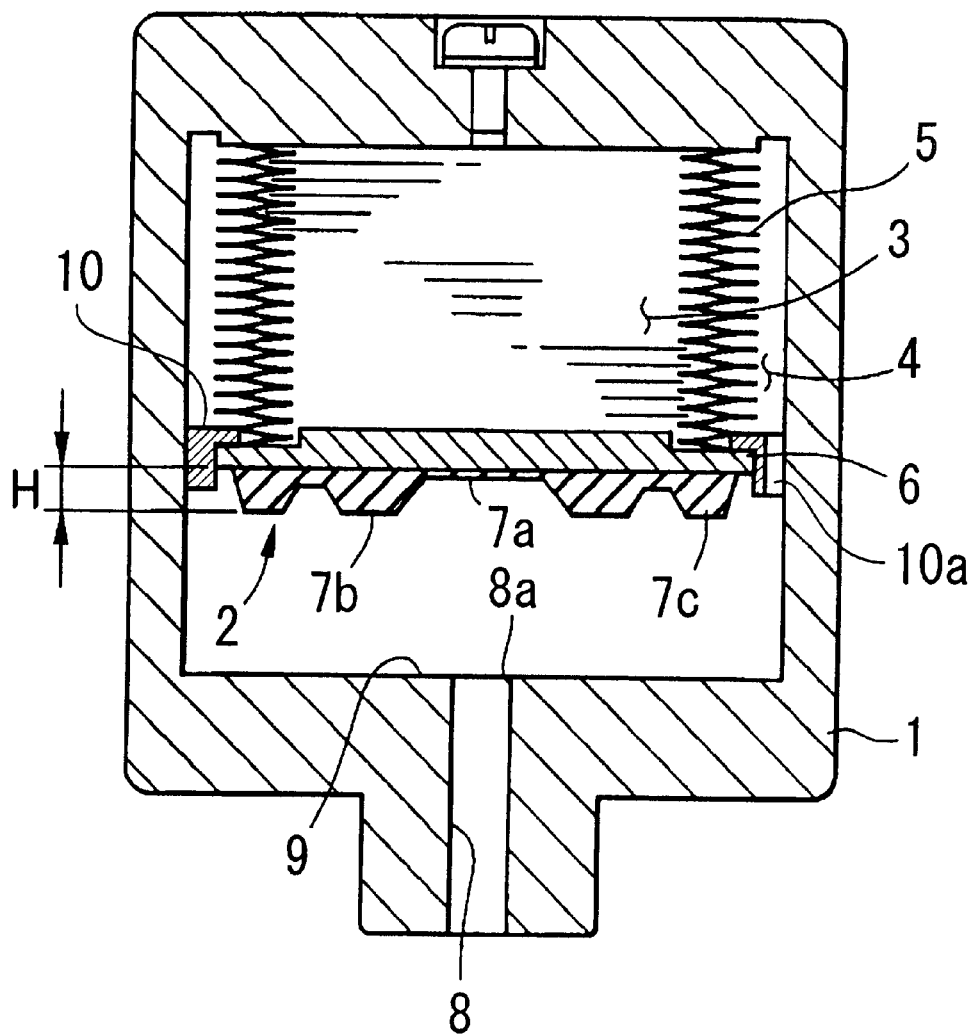
FIG. 2 is a side cross section showing the operation of the accumulator of the first embodiment according to the invention.

The operation of the above accumulator so constructed will be explained with reference to FIGS. 1 and 2 hereinafter. When the hydraulic pressure in the flow path 8 is greater that in the gas chamber 3, as shown in FIG. 2, the metallic bellows 5 is contracted, the valve 7 separates from the opening 8a, the hydraulic chamber 4 and the flow path 8 are communicated with each other, and pressure is accumulated according to the contraction of the metallic bellows 5.

When the hydraulic pressure in the flow path 8 is decreased due to factors such as pulsation, stopping, and variation of load in a pump (not shown), the metallic bellows 5 is extended to compensate for the hydraulic pressure in the flow path 8. When the hydraulic pressure in the flow path 8 becomes lower than that in the gas chamber 3, as shown in FIG. 1, the valve 7 is closely contacted with the valve seat 9 and closes the opening 8a. The valve 7 has a dual structure consisting of the first circular protrusion 7b and the second circular protrusion 7c formed therearound. Therefore, there is no concern that the hydraulic pressure in the hydraulic chamber 4 will decrease since one of the circular protrusions reliably seal the opening 8a even if the sealing properties in one of the circular protrusions 7b and 7c are decreased due to the factors such as aging degradation thereof and jamming of foreign matter.

It should be noted that although the heights and flexibility of the circular protrusions 7b and 7c are the same in the above accumulator, the flexibility of the first circular protrusion 7b may be greater than that of the second circular protrusion 7c by changing the thickness and/or material thereof, and the height of the first circular protrusion 7b may be relatively greater than that of the second circular protrusion 7c, so that the first circular protrusion 7b closes the opening 8a in advance and not simultaneously rather than the second circular protrusion 7c. In such constructions, the surface pressure of the first circular protrusion 7b is greater than that of the second circular protrusion 7c, so that the sealing properties in the usual operations can be further improved.

Figure 3:
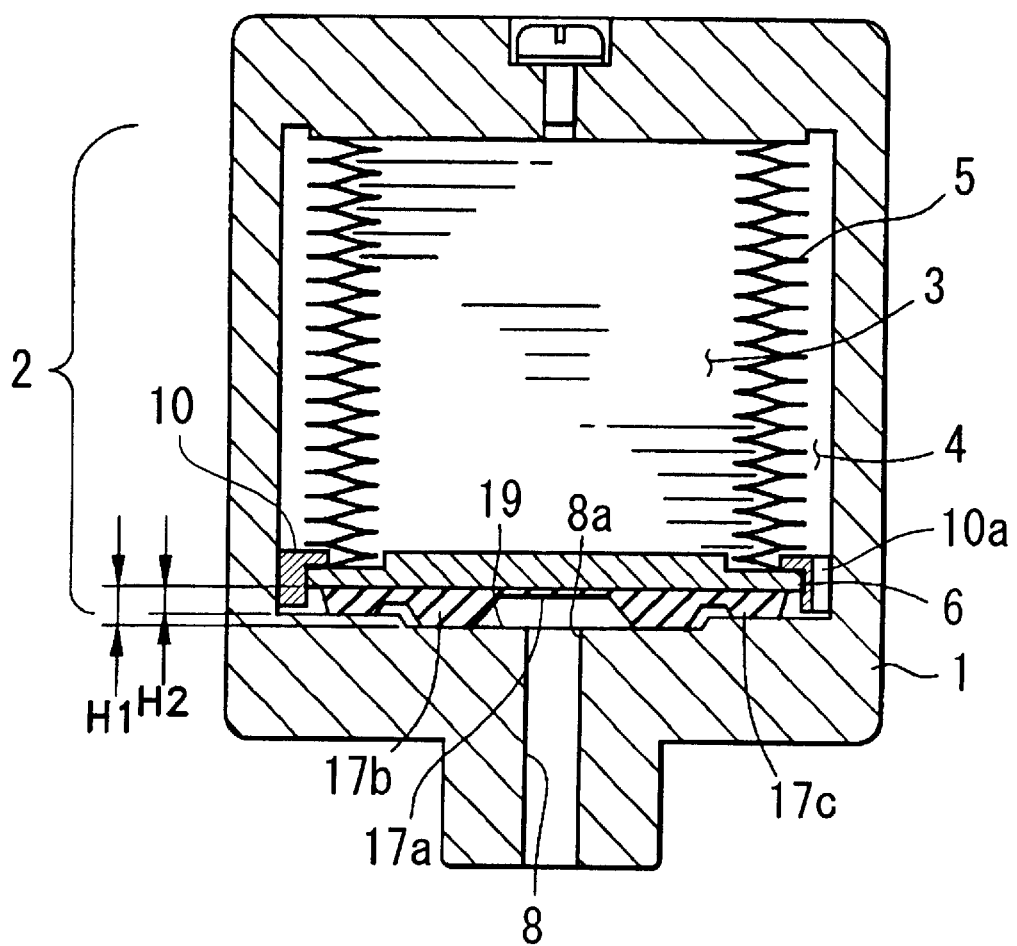
FIG. 3 is a side cross section of an arrangement of the accumulator of the first embodiment according to the invention.

FIG. 3 is a drawing similar to FIG. 1, showing an arrangement of the first embodiment. In FIG. 3, corresponding numerals as in FIG. 1 are attached to the same elements as in FIG. 1, and detailed explanation of the same elements will be omitted. In the structure, the valve 17 is the same as in the first embodiment in having a dual structure consisting of an upper surface portion 17a, a first circular protrusion 17b projecting downward from the first circular protrusion 17b, and a second circular protrusion 17c formed around the first circular protrusion 17b. However, the length H1 in the projection direction of the inner first circular protrusion 17b is longer than the length H2 in the projection direction of the second circular protrusion 17c. That is, a difference in level is provided between the both. Furthermore, the valve seat 19 at the opening 8a side is also formed with a difference. In this structure, the inner first circular protrusion 17b essentially receives the pressure, and the outer second circular protrusion 17c inhibits entry of foreign matter, such as dust, into the first circular protrusion 17b, and the sealing properties thereof can be further improved. Other structures and advantages, in which there is no concern that the hydraulic pressure in the hydraulic chamber 4 will decrease since one of the circular protrusions reliably seals the opening 8a even if the sealing properties in one of circular protrusions 17b and 17c is decreased due to the factors such as aging degradation thereof and jamming of foreign matter, are the same as in the first embodiment.

Figure 4:
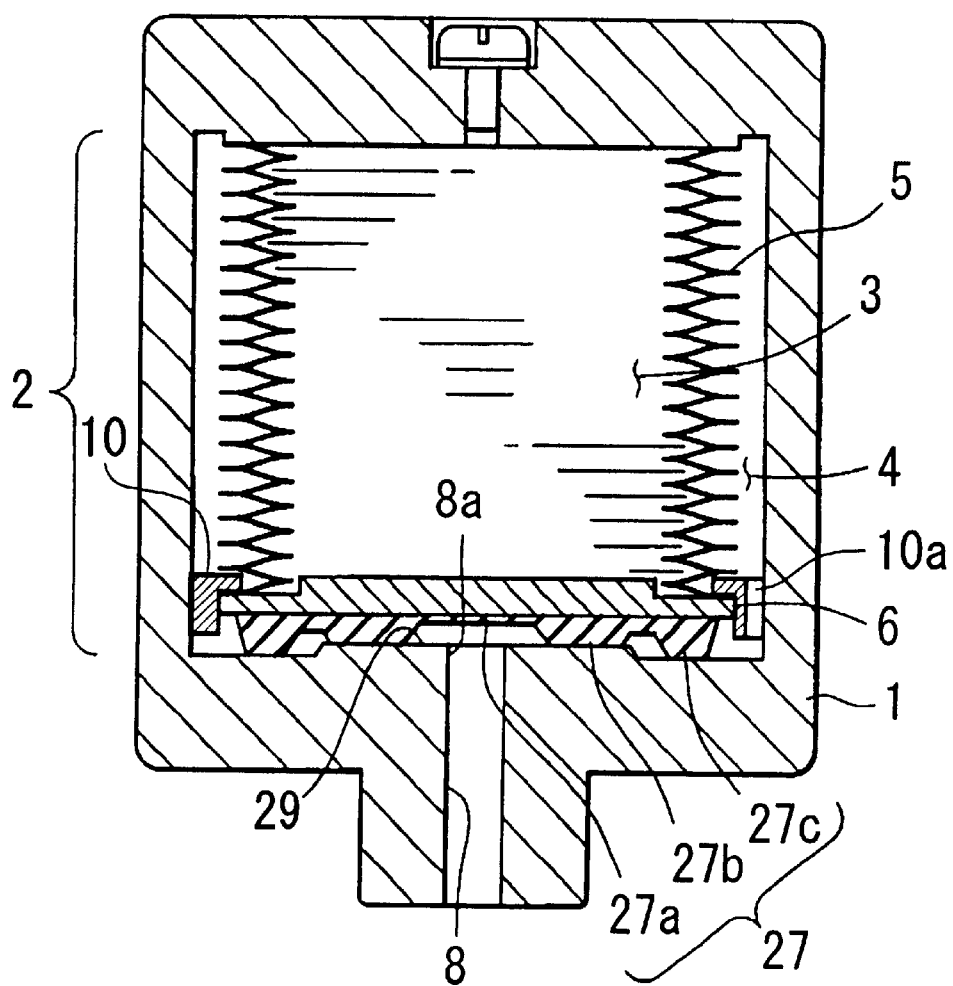
FIG. 4 is a side cross section of the arrangement of the accumulator of the first embodiment according to the invention.
Figure 5:
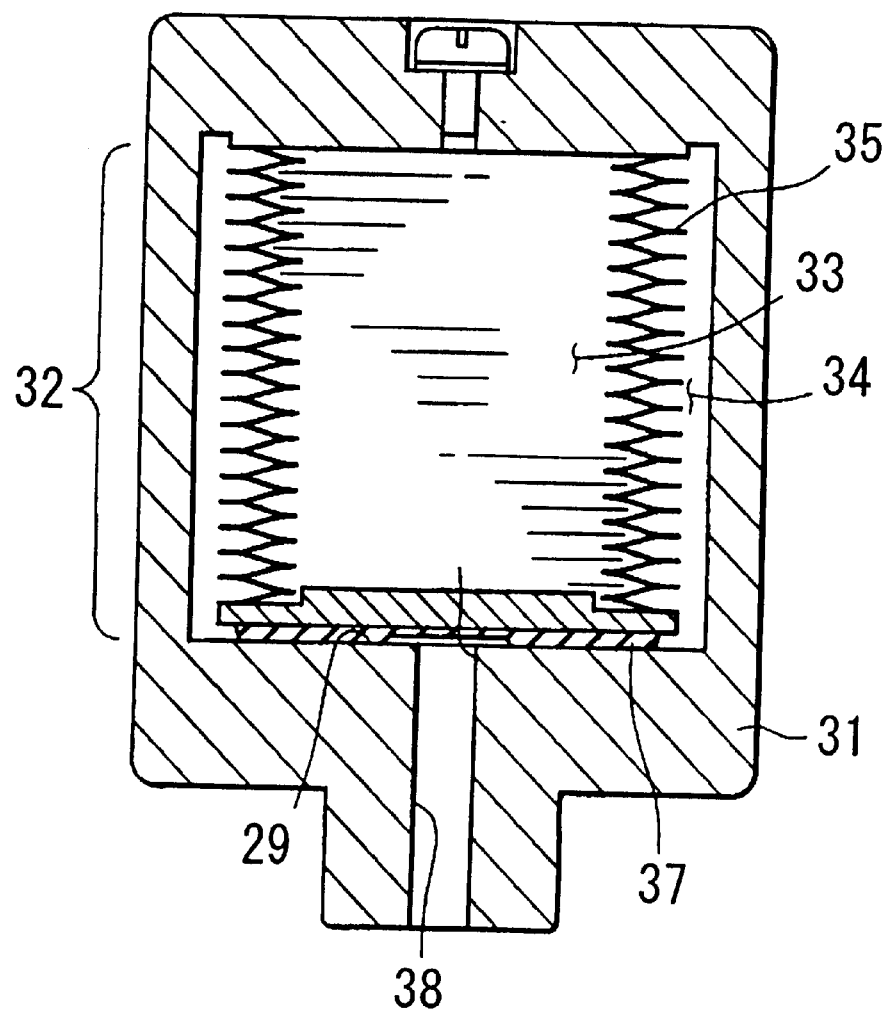
FIG. 5 is a side cross section of a conventional accumulator.

FIG. 4 is similar to FIG. 3, showing another arrangement of the first embodiment. In the structure, the valve 17 is the same as in the first embodiment in having a dual structure consisting of an upper surface portion 27a, a first circular protrusion 27b projecting downward from the first circular protrusion 27b, and a second circular protrusion 27c formed around the first circular protrusion 27b. However, the length H3 in the projection direction of the outer second circular protrusion 27c is longer than the length H4 in the projection direction of the inner first circular protrusion 27b. That is, a reverse difference in level is provided between the both. Furthermore, the valve seat 29 at the opening 8a side is also formed with a differential corresponding to the above difference in level. The functions and advantages in the arrangement is the same as in the above arrangement.

It should be noted that although the dual structure consisting of the first and second circular protrusions is applied in the arrangements, a further circular protrusion may be provided around the second protrusion so as to form a triple structure.

The second embodiment of the invention will be explained hereinafter.

Figure 6:
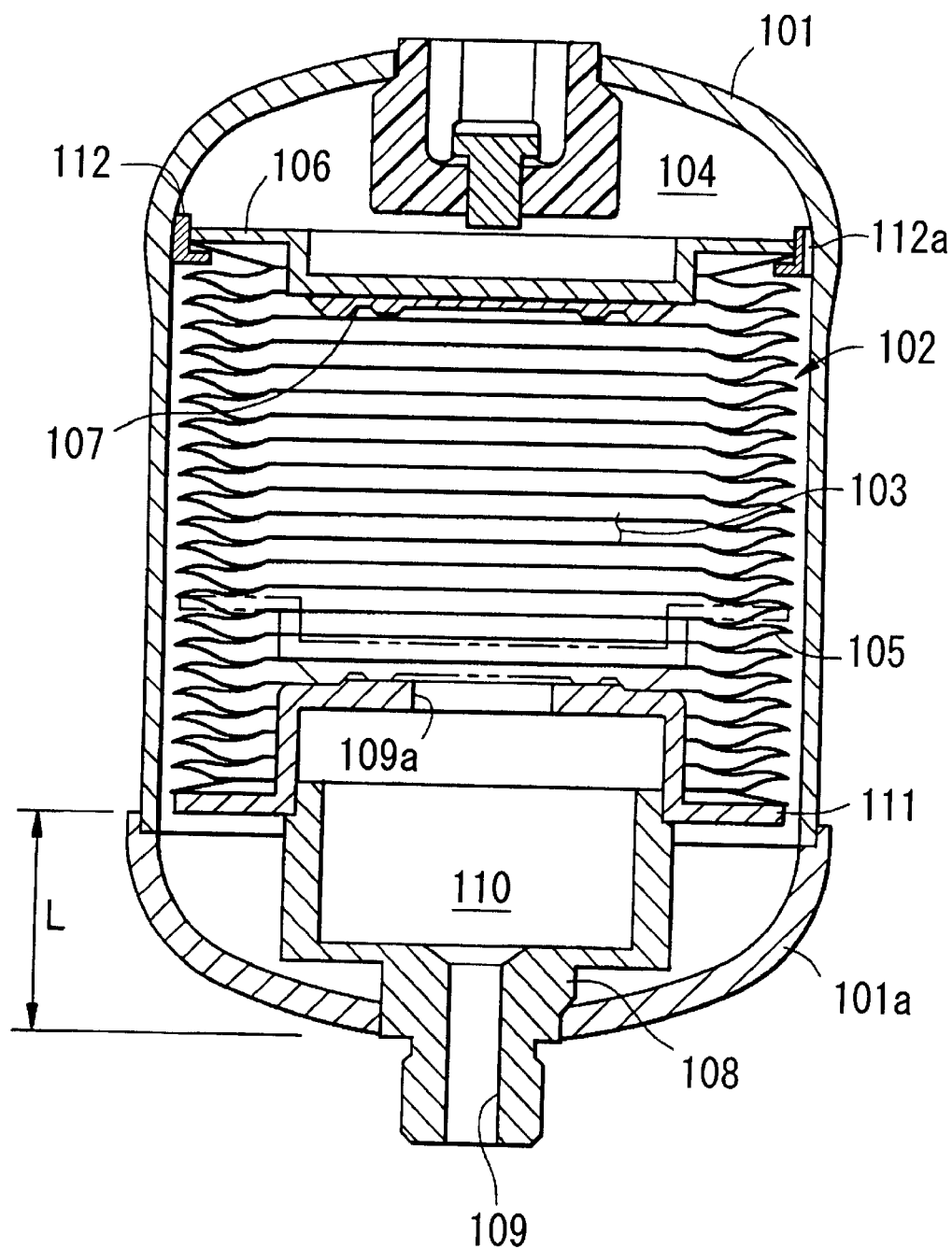
FIG. 6 is a side cross section of an accumulator of the second embodiment according to the invention.

FIG. 6 is a cross section of an accumulator according to the invention, and numeral 101 is a housing acting as a pressure vessel. The housing 101 has a cylindrical shape with a bottom. The interior of the housing 101 is partitioned into a hydraulic chamber 103 and a gas chamber 104 by a metallic bellows assembly 102. The metallic bellows assembly 102 comprises a metallic bellows 105 having plural ribs and elastic in the axial direction of the housing 101, a free end cap 106 provided at the free end of the metallic bellows 105, and a base end cap 111 provided at the base end of the metallic bellows 105. The metallic bellows assembly 102 further comprises a valve 107 which is made from elastomeric materials such as rubber and is attached to the free end cap 106 at the inside of the metallic bellows 105. The metallic bellows assembly 102 is fixed to the housing 101 by fixing the base end cap 111 to the bellow-mentioned plug 108.

The hydraulic chamber 103 is communicated with an external system through an opening 109a, the plug 108 provided to the end plate of the housing 101, and a flow path 109. In the gas chamber 104 which is defined in the housing 101 and in the exterior of the metallic bellows 105, a compressed gas and suitable amount of an operating fluid for adjusting the spring constant of the metallic bellows 105 in the expansion and contraction thereof are sealed.

The end plate 101a, which is removably attached at the base end side of the housing 101 by a suitable means such as a screw, has a cross section of which the configuration is a semi-ellipsoid in which the proportion of the major axis to the minor axis is 4:1. It should be noted that the end plate 101a may be fixed to the housing 101 after the shape and the size of the resonance box 110 are determined. The plug 108 is formed with a resonance box 110 which is contained in the dead space L formed by the end plate 101a. The resonance box 110 enables to absorb pulsation occurring in a lower pressure than the operating pressure of the accumulator.

A bellows guide 112 is fixed at the circumference of the free end cap 106. The bellows guide 112 is ring-shaped and slideably fitted into the inner surface of the housing 101. Plural through holes 112a are formed at the outer circumference of the bellows guide 112 therealong at regular intervals. The bellows guide 112 support the free end of the metallic bellows 105 so that it may not swing in the elastic motion thereof. In the elastic motion of the metallic bellows 105, the gas in the gas chamber 104 passes through the through hole 112a.

Figure 7:
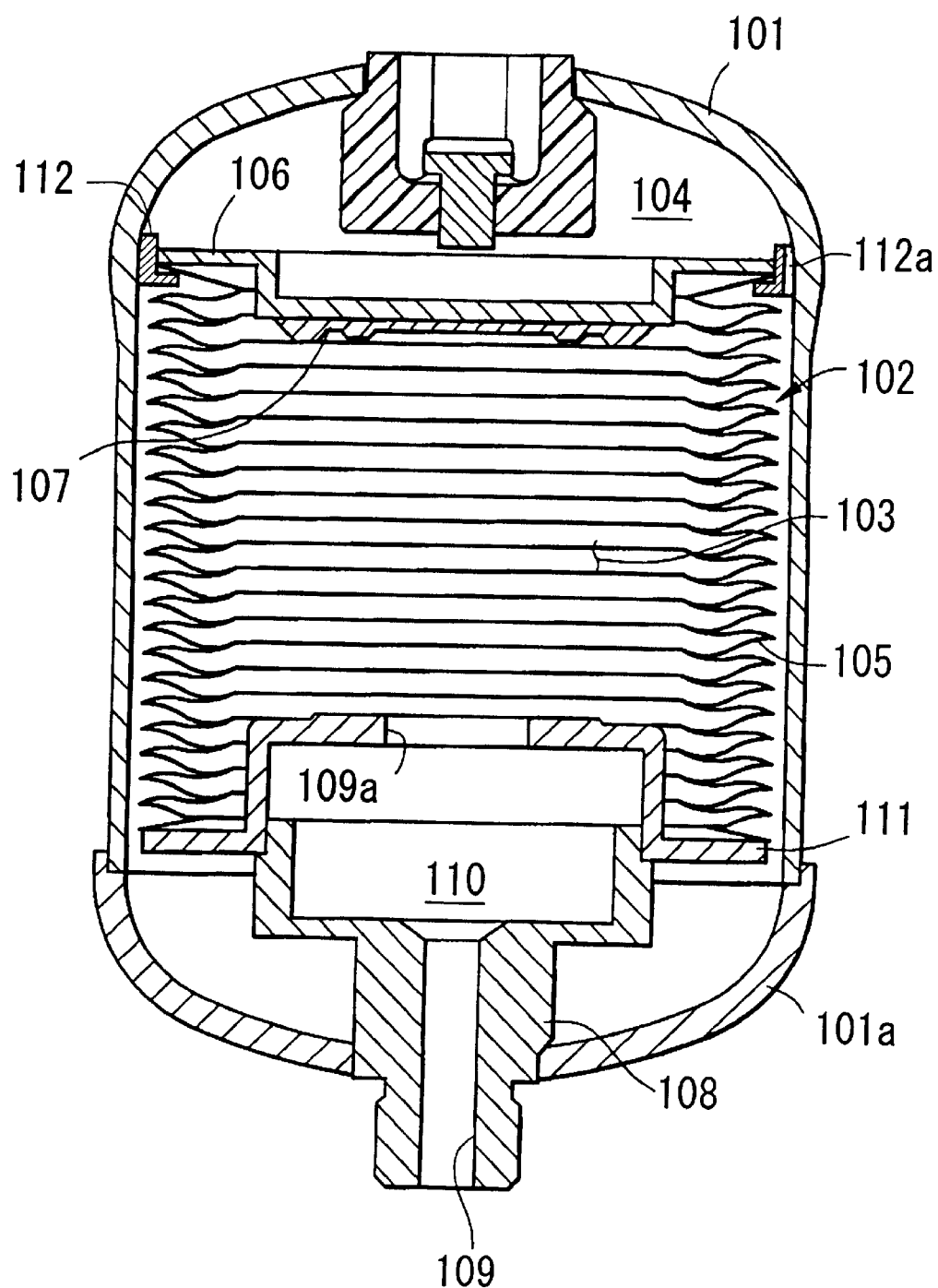
FIG. 7 is a side cross section of the accumulator showing the condition in which the plug member is replaced.

Plural plugs 108 with resonance boxes 110 having various volumes are prepared according to frequencies of pulsation to be absorbed, and are replaceable according to the system to which the accumulator is to be attached (see FIG. 7).

According to the accumulator, when the hydraulic pressure in the flow path 109 is greater than that of the gas sealed in the accumulator, the metallic bellows 105 is extended until the pressure in the flow path 109 coincides with the pressure in the gas chamber 104, and the valve 107 separates from the opening 109a, so that the hydraulic chamber 103 and the flow path 109 are communicated with each other, and pressure is accumulated according to the extension of the metallic bellows 105. When the hydraulic pressure in the flow path 109 is decreased due to the factors such as pulsation, stopping, and variation of load in a pump (not shown), the metallic bellows 105 is contracted to compensate the hydraulic pressure in the flow path 109. When the hydraulic pressure in the flow path 109 becomes lower than the gas pressure in the accumulator, as shown by a virtual line, the valve 107 is thrust to the circumference of the opening 109a and closely contacts therewith to close the opening 109a, thereby self-sealing to maintain the pressure in the hydraulic chamber 103 greater than that of the gas chamber 104.

It should be noted that the resonance box 110 of the plug 108 is designed such that the volume, the length, and the cross section are not variable. The volume of the resonance box may be variable while the accumulator is operated. For example, the resonance box may be divided into plural chambers, which may be opened or closed by valves driven by an external system, so that the volume of the resonance box can usually be variable. The length of the flow path 109 may be variable, such as in periscopes, and the length may be driven by an actuator. The opening area, that is, the cross section of the flow path 109, may be variable by butterfly valves and the like.

The third embodiment of the invention will be explained with reference to FIGS. 8 to 13 hereinafter.

Figure 8:
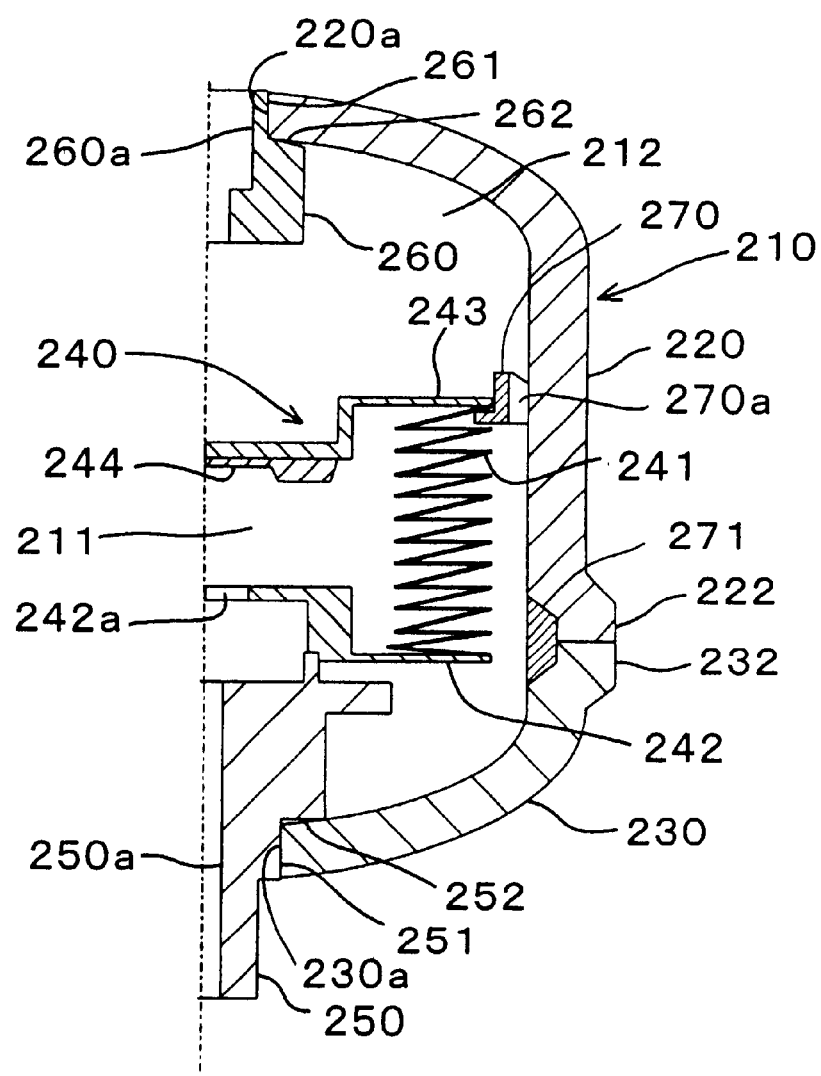
FIG. 8 is a side cross section of an accumulator of the third embodiment according to the invention.

FIG. 8 is a cross section showing an accumulator of the embodiment according to the invention. In the figures, reference numeral 210 is a cylindrical shell, and 240 is a metallic bellows (buffer member) which partitions the interior of the shell 210 into a hydraulic chamber 211 and a gas chamber 212. Reference numeral 250 is a port forming a communicating path in the hydraulic chamber 211 side, and 260 is a plug retainer to which a plug for sealing the gas chamber 212 is attached.

The shell 210 forms a sealed vessel by joining a bottom shell 220 as a main component and a cap shell 230 of which the axial length is shorter than that of the bottom shell 220, and the shells 220 and 230 are divided in the axial direction before the joining. The shells 220 and 230 are formed by pressing to a uniform thickness from metals such as copper, and the bodies thereof extending in the axial direction are joined to each other by welding.

The bellows 240 consists of a bellows body 241 which is elastic in the axial direction, a bottom seal 242 fixed at an end of the bellows body 241, and a bellows cap 243 fixed at another end of the bellows body 241. The bottom seal 242 and the bellows cap 243 are connected to the bellows body 241 by a welding method such as tungsten inert gas welding or plasma welding. In the bellows 240, the bottom seal 242 is fixed to the port 250 by welding, the inner space above the bottom seal 242 forms the hydraulic chamber 211, and the space defined by the bellows 240 and the shell 210 constructs the gas chamber 212. The hydraulic chamber 211 is communicated with a hydraulic system (not shown), and an inert gas such as nitrogen gas is sealed in the gas chamber 212 at a predetermined pressure. A hydraulic opening 242a is formed at the center of the bottom seal 242. A self seal 244 made from rubber is adhered to the inner surface of the bellows cap 243. The self seal 244 prevent excessive compression of the bellows body 241 and damage of the bellows cap 243 due thereto.

The port 250 is a cylindrical body consisting of a fitting circumference 251 which fits into a through hole 230a formed at the center of the cap shell 230, and a circular step portion 252 extending outward from the fitting circumference 251 and engaging with the inner surface of the cap shell 230. A hydraulic path 250a communicated with the hydraulic system is formed at the center of the port 250. The port 250 is inserted into the through hole 230a from inner side of the cap shell 230, the step portion 252 is engaged with the inner surface of the cap shell 230, the fitting circumference 251 is fitted into the through hole 230a, and the port 250 is then welded to the cap shell 230.

The plug retainer 260 is a cylindrical body consisting of a fitting circumference 261 which fits into a through hole 220a formed at the center of the bottom shell 220, and a circular step portion 262 extending outward from the fitting circumference 261 and engaging with the inner surface of the bottom shell 220. The plug retainer 260 is fixed to the bottom shell 220 by welding. A gas feeding opening 260a is formed at the center of the plug retainer 260. The gas feeding opening 260a is sealed by screwing or welding a plug (not shown) therein after a gas is sealed in the gas chamber 212.

A bellows guide 270 is fixed at the circumference of the bellows cap 243. The bellows guide 270 is ring-shaped and slideably fitted into the inner surface of the shell 210. Plural through holes 270a are formed at the outer circumference of the bellows guide 270 therealong at regular intervals. The bellows guide 270 support the free end of the bellows body 241 so that it may not swing in the elastic motion thereof. In the elastic motion of the bellows body 241, the gas in the gas chamber 212 passes through the through hole 270a.

According to the accumulator having the above construction, hydraulic fluid is fed into the hydraulic chamber 211 through the hydraulic opening 242a of the bottom seal 242 from the hydraulic path 250a of the port 250. When the pressure of the hydraulic fluid in the hydraulic chamber 211 exceeds the pressure in the gas chamber 212, the bellows body 241 is extended and the gas in the gas chamber 212 contracts. When the pressure of the hydraulic fluid exceeds the pressure in the gas chamber 212, the bellows body 241 is extended and the gas in the gas chamber 212 contracts. When the pressure of the hydraulic fluid in the hydraulic chamber 211 is lower than the pressure in the gas chamber 212, the bellows body 241 is contracted and the gas in the gas chamber 212 expands. For the expansion and contraction of the gas in the gas chamber 212, variation of the pressure in the hydraulic fluid in the hydraulic system is absorbed, and pulsation of the hydraulic fluid can be inhibited.

The manufacturing process according to the invention will be explained in order of steps.

(A) Attachment of bellows and port to cap shell

Figure 9A:
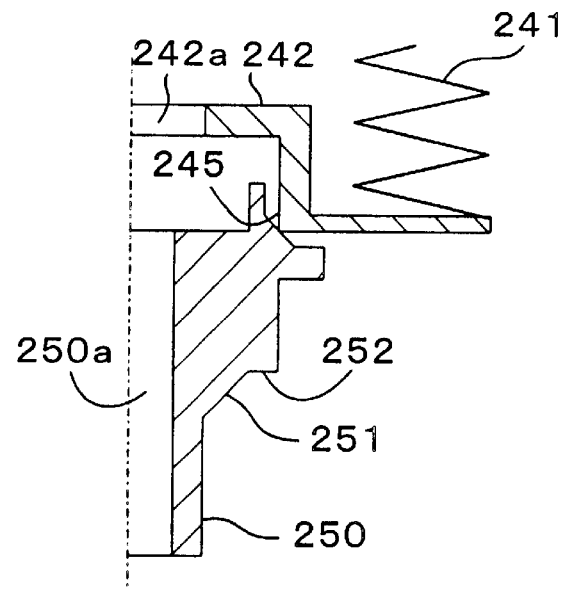
Figure 9B:
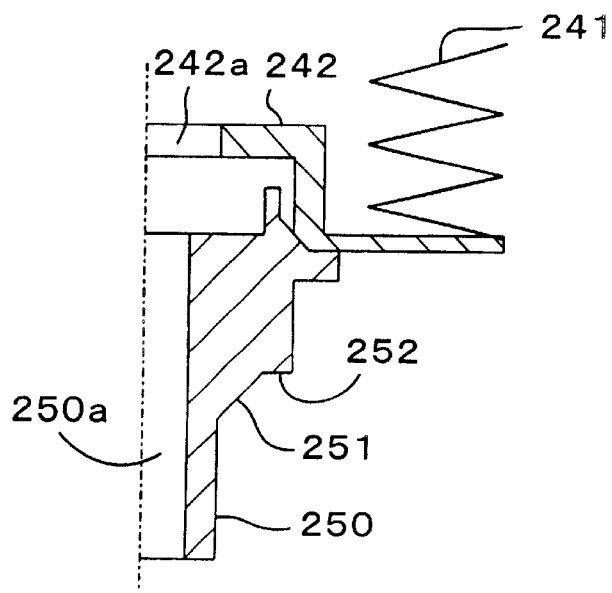

As shown in FIG. 8, the bellows body 241 is fixed to the bottom seal 242 by welding such as tungsten inert gas welding or plasma welding. Then, the bottom seal 242 is welded to the port 250. As shown in FIG. 9A, an edge 245 at approximately a right angle before the welding is formed at the inner surface of the bent portion on the lower surface of the bottom seal. The edge 245 is brought into contact with the welding portion of the port 250 and is pushed to the port 250, and these are then welded by electric resistance welding. This welding is projection welding since the edge 245 is a projection, and the edge 245 of the bottom seal 242 is mainly melted and welded.

Figure 10A:
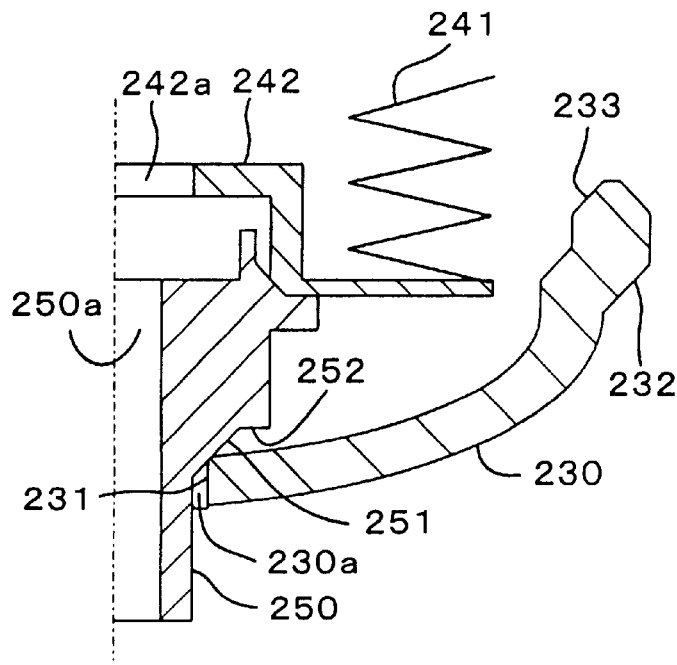
Figure 10B:
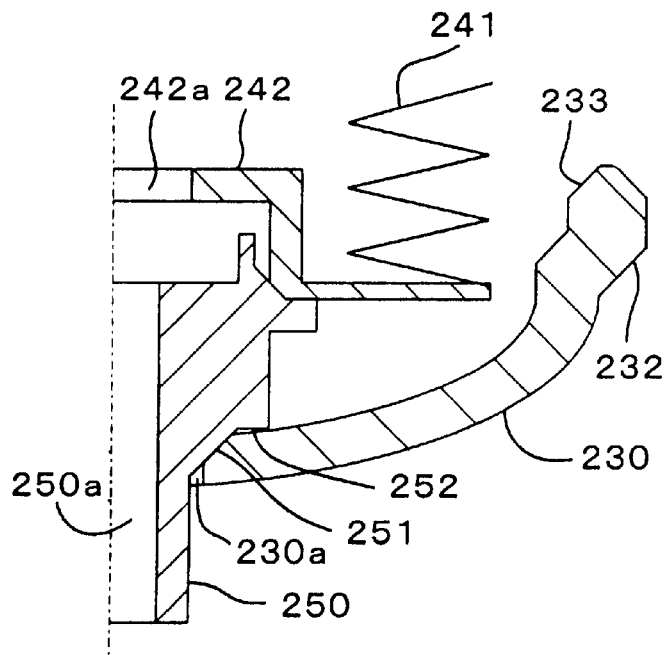

Then, the cap shell 230 and port 250 are projection welded in the same manner. As shown in FIG. 10A, in the condition that the port 250 is inserted into the through hole 230a of the cap shell 230 from the inside thereof before welding, the edge 231 at the inside of the through hole 230a (upper side in FIGS. 10A and 10B) is brought into contact with the fitting circumference 251 of the port 250. In this condition, the edge 231 is pushed to the inside and welded with the fitting circumference 251 as shown in FIG. 10B. In the welding, the edge 231 of the cap shell 230 is mainly melted and welded. Then, as shown in FIG. 8, the bellows cap 243 is welded to the bellows body 241 by welding such as tungsten inert gas welding or plasma welding.

(B) Attachment of plug retainer to bottom shell

Figure 11A:
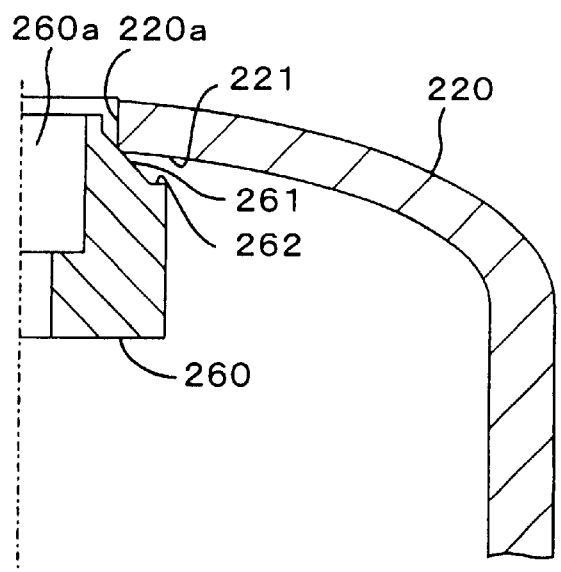
Figure 11B:
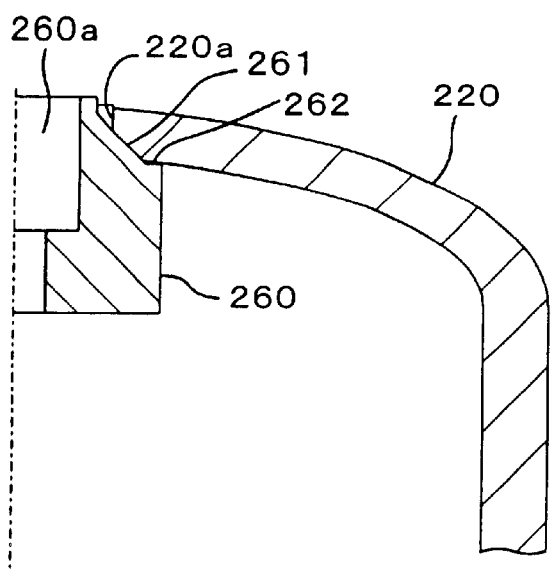

The plug retainer 260 is projection welded to the bottom shell 220. As shown in FIG. 11A, when that the plug retainer 260 is inserted into the through hole 220a of the bottom shell 220 from inside thereof before welding, the edge 221 at the inside of the through hole 220a (lower side in FIGS. 11A and 11B) is brought into contact with the fitting circumference 261 of plug retainer 260. In this condition, the edge 221 is pushed to the inside and is welded with the fitting circumference 261 as shown in FIG. 11B. In the welding, the edge 221 of the bottom shell 220 is mainly melted and welded.

After the above steps (A) and (B), the bellows 240 and the port 250 is attached to the cap shell 230, and the plug retainer 260 is attached to the bottom shell 220. Then, the bottom shell 220 and the cap shell 230 are joined by projection welding.

(C) Joining bottom shell with cap shell

Figure 12:
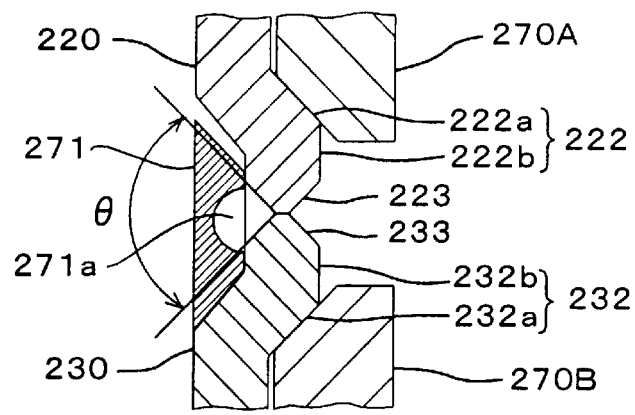
FIG. 12 is a cross section of a joining portion showing a status before a bottom shell and a cap shell are welded by projection welding.
Figure 13:
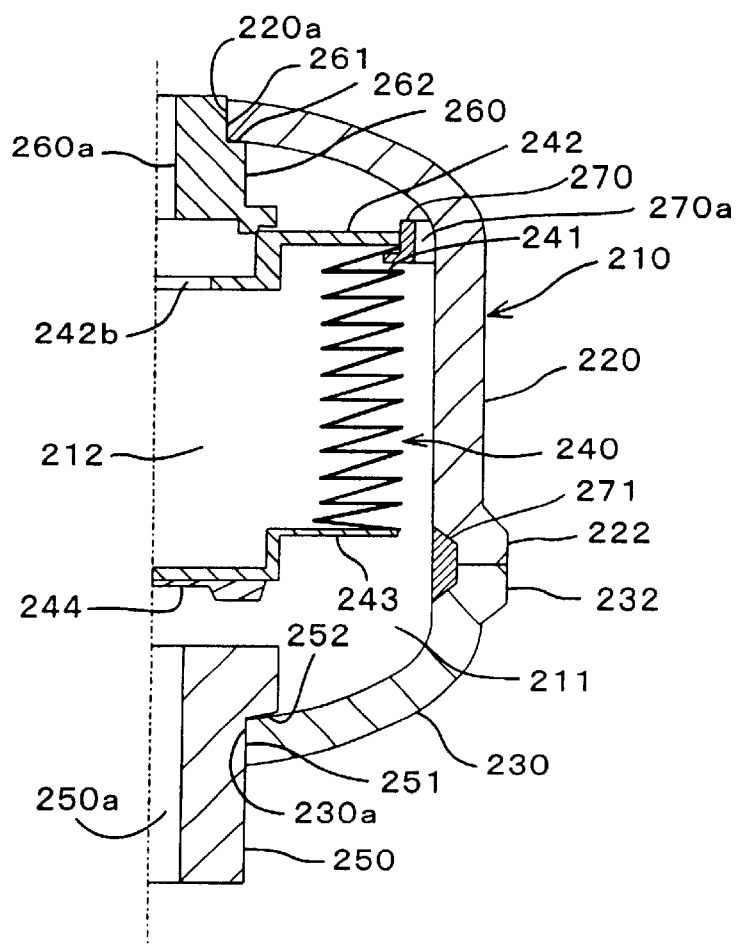
FIG. 13 is a cross section of an arrangement of the accumulator according to the invention.

As shown in FIG. 12, circular circumferences 222 and 232 projecting outward are formed at the joining portion of the shells 220 and 230 over the entire circumference. The circular circumferences 222 and 232 consist of conical portions 222a and 232a projecting in the axial direction at an angle of 45°, and small circumferential portion 222b and 232b extending in the axial direction from the front edge of the conical portions 222a and 232a. In the shells 220 and 230, circular protrusions 223 and 233 with triangular cross section tapering toward the joining portion are formed at the end of the circumferential portions 222b and 232b over the entire circumference.

As shown in FIG. 12, a ring-shaped bellows protector 271 is fixed at the inner surface of the cap shell 230. A groove 271a is formed at the outer surface of the bellows protector 271 over the entire circumference thereof. The inner diameter of the bellows protector 271 coincides with the that of the shell 210. The axial length of the bellows protector 271 is designed such that there is a clearance between the bottom shell 220 and it before welding the bottom shell 220 with the cap shell 230, and the clearance disappears after the welding. The bellows protector 271 is made from an insulating resin or the like so as to provide insulating properties from the cap shell 230. Alternatively, the bellows protector 271 may be made from a metallic material such as steel, and at least a portion which contacts the bottom shell 220 is coated by an insulating resin so as to provide insulating properties from the cap shell 230.

In welding the shells 220 and 230, as shown in FIG. 12, circular protrusions 223 and 233 are brought into contact with each other, and the circular circumferences 222 and 232 are clamped by a pair of electrodes 270A and 270B. The circular protrusions 223 and 233 are mutually tightly thrust by pressing them with the electrodes 270A and 270B. Maintaining this condition, the electrodes 270A and 270B are energized and projection welding is performed. In the welding, the circular protrusions 223 and 233 are melted and welded. The groove angle (angle θ in FIG. 12) in contacting the circular protrusions 223 and 233 with each other is about 90°.

In an electric resistance welding, a spark is often emitted from the joining portion. The spark does not strikes the bellows body 241 since it is shielded by the bellows protector 271. Therefore, damages to the bellows body 241 by the spark can be prevented and the service life thereof can be ensured. Beads projecting inward and outward are formed in an electric resistance welding. The bead projecting inward is inserted into the groove 271a of the bellows protector 271. The bottom shell 220 come into proximity with the cap shell 230 in the electric resistance welding. As a result, the bottom shell 220 is brought into contact with the bellows protector 271 and the clearance disappears.

In the method for welding the bottom shell 220 and the cap shell 230, the welding is performed over the entire circumference by instantaneous projection welding. Therefore, the time required for welding the shells 220 and 230 can be greatly shortened compared to the conventional welding method. As a result, mass manufacturing efficiency is improved and production cost can be reduced. The recess at the inner surface of the circular circumferences 222 and 232 is embedded with the bellows protector 271, so that the inner surface of the shell 210 can be smooth. When the joining portion of the bottom shell 220 and the cap shell 230 is located at the intermediate thereof in the axial direction, the bellows guide 270 slides over the joining portion, and the bellows guide 270 is guided by the bellows protector 271 so as to smooth the sliding.

Projection welding is not smoothly performed when the materials have large differences in the heat capacities thereof. In the embodiment of the invention, the thickness of the bottom shell 220 and the cap shell 230 are approximately uniform and the heat capacities thereof are approximately the same. Therefore, the projection welding is smoothly performed and the sealing of the shell 210 is reliable and strong. For making the thickness of the bottom shell 220 and the cap shell approximately uniform, press forming is preferably performed without machining and forging. This forming method decreases manufacturing cost.

The accumulator is a type in which the interior of the bellows 240 forms the hydraulic chamber 211. The manufacturing method in the invention can be applied to the accumulator in FIG. 13 in which the interior of the bellows 240 forms the gas chamber 212. In the figure, the same numerals as in FIG. 8 are put on the same elements as in FIG. 8. In the accumulator, the bottom seal 242 of the bellows 240 is welded to the plug retainer 260, and the gas feeding opening 242b is formed in the bottom seal 242. The self seal 2444 is adhered to the outer surface of the bellows cap 243. The inner space of the bellows 240 forms the gas chamber 212, and the space defined by the bellows 240 and the shell 210 forms hydraulic chamber 211. The procedure of assembling the accumulator is the same as for the above embodiment, except that the bottom seal 242 is welded to the plug retainer 260 instead of the port 250, and the accumulator can be manufactured with the same welding method as in the above embodiment.

It should be noted that although the accumulator in the embodiment uses the metallic bellows 240 as buffer members for partitioning the interior of the shell 210 into the hydraulic chamber and the gas chamber 212, the bellows 240 may be made from materials other than metal. The buffer member is not limited to bellows, and pistons, diaphragms, and balloons may be used. Although the hydraulic fluid goes in and out the hydraulic path 250a in the embodiment, the invention may be applied to the inline-type accumulator in which an inlet and an outlet to the hydraulic chamber 211 may be individually provided and the hydraulic fluid is fed along the axial direction.

What is claimed is:

1. A manufacturing process for an accumulator, the process comprising:

assembling a buffer member into a cylindrical shell so as to partition a interior of the shell into a gas chamber and a hydraulic chamber; and closing the shell;

wherein the shell comprises shell portions divided in the direction of an axis of the shell;

forming a circular circumferential portion projecting outward over the entire circumference of each joining portion of the shell portions;

forming a circular protrusion projecting in a joining direction at the circular circumferential portion of at least one of the shell portions;

contacting the circular protrusions with each other, alternatively the circular protrusion is brought into contact with the circular circumferential portion of another shell portion;

clamping and pressing the circumferential portions by a pair of electrodes; and energizing the electrodes so as to join the joining portions by electric resistance welding.

2. A manufacturing process for an accumulator according to claim 1, wherein a protector is provided at an inner surface of the circular circumference of one of the shell portions, the protector avoids a spark occurred in the electric resistance welding from emitting into the inside of the shell portion.

3. A manufacturing process for an accumulator according to claim 2, wherein a recess is provided at an inner surface of the circular circumferences, the protector is contained into the recess.

4. A manufacturing process for an accumulator according to claim 3, wherein the protector has an inner diameter, which coincides with an inner diameter of the shell portions.

* * * * *

UNITED STATES PATENT AND TRADEMARK OFFICE
CERTIFICATE OF CORRECTION

PATENT NO.    : 6,525,290 B2
DATED         : February 25, 2003
INVENTOR(S)   : Shimbori et al.

It is certified that error appears in the above-identified patent and that said Letters Patent is hereby corrected as shown below:

<u>Title Page,</u>
Item [73], please change the address of the Assignee from "Tokyo (JP)" to
-- Kanagawa (JP) --.

Signed and Sealed this

Twenty-seventh Day of May, 2003

JAMES E. ROGAN
*Director of the United States Patent and Trademark Office*